(12) United States Patent
Asahara et al.

(10) Patent No.: US 8,434,358 B2
(45) Date of Patent: May 7, 2013

(54) METHOD FOR MEASURING AIRSPEED BY OPTICAL AIR DATA SENSOR

(75) Inventors: Takashi Asahara, Tokyo (JP); Hamaki Inokuchi, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 159 days.

(21) Appl. No.: 13/017,359

(22) Filed: Jan. 31, 2011

(65) Prior Publication Data
US 2011/0219869 A1 Sep. 15, 2011

(30) Foreign Application Priority Data

Mar. 9, 2010 (JP) .................................. 2010-51799

(51) Int. Cl.
*G01P 13/00* (2006.01)
(52) U.S. Cl.
USPC ........................................................ 73/170.02
(58) Field of Classification Search .................. None
See application file for complete search history.

(56) References Cited

U.S. PATENT DOCUMENTS

| 6,751,532 | B2 | 6/2004 | Inokuchi | |
|---|---|---|---|---|
| 2004/0027570 | A1* | 2/2004 | Caldwell et al. | 356/338 |
| 2005/0248748 | A1* | 11/2005 | Caldwell et al. | 356/28 |
| 2007/0109528 | A1* | 5/2007 | Caldwell et al. | 356/28 |
| 2009/0046289 | A1* | 2/2009 | Caldwell et al. | 356/341 |
| 2009/0051896 | A1* | 2/2009 | Caldwell et al. | 356/28 |
| 2010/0195100 | A9* | 8/2010 | Caldwell et al. | 356/341 |
| 2010/0277715 | A1* | 11/2010 | Caldwell et al. | 356/28.5 |
| 2010/0280767 | A1* | 11/2010 | Caldwell et al. | 702/50 |
| 2012/0169053 | A1* | 7/2012 | Tchoryk et al. | 290/44 |

FOREIGN PATENT DOCUMENTS

| JP | 2003-14845 A | 1/2003 |
|---|---|---|
| JP | 2004-264184 A | 9/2004 |
| JP | 2009-300133 A | 12/2009 |

OTHER PUBLICATIONS

Inokuchi, Hamaki et al., "Development of an Onboard Doppler Lidar for Flight Safety", Journal of Aircraft, 2009, vol. 46, No. 4, pp. 1411-1415.
Inokuchi, Hamaki, "Position Error for the Airspeed Sensor of the Multi-Purpose Aviation Laboratory MuPAL-α", Technical Memorandum of National Aerospace Laboratory of Japan, TM-776, 2003, pp. 1-9.

* cited by examiner

*Primary Examiner* — Andre Allen
(74) *Attorney, Agent, or Firm* — Cheng Law Group, PLLC

(57) ABSTRACT

The object of the present invention is to provide an air data sensor that does not require an external input of a reference velocity as a Doppler LIDAR, has a function of autonomously determining the absolute airspeed, and has no position error. The optical air data sensor in accordance with the present invention is an optical air data sensor, mounted on an aircraft, for emitting a laser light as a transmission light into atmosphere, and then receiving a laser scattered light produced by scattering of the laser light by aerosol present in the atmosphere as a reception light, thereby to measure an airspeed and a wind velocity of airflow in a distant region on the basis of a Doppler shift amount between the transmission light and the reception light, wherein a true airspeed is autonomously measured, without setting a reference velocity, by successively sweeping a frequency offset corresponding to a reference velocity for providing an offset to a measurement frequency, and performing this sweeping within a frequency range in which the Doppler shift amount is measured.

15 Claims, 4 Drawing Sheets

(a) THREE-POINT MEASUREMENT (b) TWO-POINT MEASUREMENT
(V1 AND V3, V2 AND V4)

METHOD FOR MEASURING AIRSPEED BY OPTICAL AIR DATA SENSOR

BACKGROUND OF THE INVENTION

1. Field of the Invention

The present invention relates to an air data sensor that measures an airspeed, an angle of attack, a sideslip angle, and turbulence in an airborne device that measures a wind velocity in a distant region at a distance of several tens of meters to about 1 km on the basis of a Doppler effect by emitting a laser light into the atmosphere and receiving a scattered light produced by scattering of the laser light in the atmosphere.

2. Description of the Related Art

In terms of flight safety and operational efficiency, the airspeed is the most important parameter for an aircraft flying in the atmosphere, and almost all of the presently used aircrafts use a Pitot tube as an airspeed measuring means. In the Pitot tube, the total pressure and static pressure of the air are measured and the airspeed is determined from a dynamic pressure, which is the difference therebetween. The airflow direction is measured by an vane. However, since the dynamic pressure measured by the Pitot tube is proportional to the second power of airspeed, the measurement error at a low velocity is high and the Pitot tube is unsuitable for velocity measurements in a low-speed range. An airspeed region in which the Pitot tube can be used is usually equal to or higher than 30 m/s. When the velocity is below this range or the airflow direction is significantly different from the axial line of the Pitot tube, the velocity measurements are inherently impossible. Further, since the vane for measuring the airflow direction is a movable component, vibrations and decrease in responsiveness caused by the mass of the vane become a problem. Therefore, in a typical aircraft having a Pitot tube as an airspeed sensor, values of airspeed in a low-speed range have a large measurement error or measurements cannot be conducted. The inventors have previously suggested an ultrasonic air data sensor (see Japanese Patent Application Laid-open No. 2004-264184 "Ultrasonic Air Data Sensor", published on Sep. 24, 2004).

However, in a sensor that is directly mounted on the fuselage as a Pitot tube or an ultrasonic air data sensor (see Hamaki Inokuchi, National Aerospace Laboratory Materials TM-776, "Position Error for the Airspeed Sensor of the Multi-Purpose Aviation Laboratory MuPAL-α", August 2003), the fuselage itself affects the flow field, thereby causing a measurement error called a position error. Therefore, a large number of calibration flight tests are necessary when the sensor is used. In general, this test is conducted repeatedly early in the morning in a time interval with calm air at a low altitude in two directions. As a result, problems are associated with noise. Moreover, since the test is easily affected by weather, a large number of test days are required. Moreover, since a calibration flight test is not conducted in a sideslip flight or close to a stalling velocity, measurement accuracy of airspeed under special flight conditions cannot be ensured.

A Doppler LIDAR using a laser light has been researched and developed as a device that measures an airflow at a distance sufficient to prevent the aircraft from affecting the flow field (see, for example, H. Inokuchi, H. Tanaka, and T. Ando, "Development of an Onboard Doppler LIDAR for Flight Safety," Vol. 46, No. 4 of the Journal of Aircraft, AIAA, July-August 2009). LIDAR is an abbreviation for "Light Detection And Ranging", that is, a technique for detection that uses light. With this technique, an emitted light is scattered by fine aerosol floating in the atmosphere, the scattered light is received, and the frequency variation (wavelength variation) according to the Doppler effect is measured, whereby the wind velocity is measured. When a Doppler LIDAR is used for turbulence avoidance flights of aircrafts, the effective measurement distance of at least 10 km is required and a laser light source with a correspondingly high output is needed. However, since the distance at which the aircraft itself produces no effect on the flow field is several tens of meters, a device with a comparatively low output is suitable for practical use as an air data sensor.

When a Doppler shift amount is measured, the frequency measurement range is usually limited by the restrictions placed by the capabilities of an AD converter. Therefore, when an airflow with a velocity higher than the wind velocity is superimposed, as in the case of an aircraft, the frequency measurement range is offset by inputting a reference velocity from the outside. Therefore, with the conventional technology, the reference velocity should be inputted from the outside and the Doppler LIDAR has no function of determining autonomously the absolute airspeed.

As mentioned hereinabove, the airspeed is extremely important for an aircraft and therefore a system including multiple Pitot tubes is usually used. However, if by any chance a malfunction occurs, it will surely produce a devastating operational effect. Even with the system including multiple Pitot tubes, since all of them operate on the same principle, the calibration also has to be performed with the same tester. Therefore, when airspeed sensors of completely different types are used, a significant increase in redundancy can be expected.

SUMMARY OF THE INVENTION

It is an object of the present invention to resolve the above-described problems and provide an air data sensor that does not require an external input of a reference velocity in a Doppler LIDAR, has a function of autonomously determining the absolute airspeed, and has no position error.

The optical air data sensor in accordance with the present invention is an optical air data sensor, mounted on an aircraft, for emitting a laser light as a transmission light into atmosphere, and then receiving a laser scattered light produced by scattering of the laser light by aerosol present in the atmosphere as a reception light, thereby to measure an airspeed and a wind velocity of airflow in a distant region on the basis of a Doppler shift amount between the transmission light and the reception light, wherein a true airspeed is autonomously measured, without setting a reference velocity, by successively sweeping a frequency offset corresponding to a reference velocity for providing an offset to a measurement frequency, and performing this sweeping within a frequency range in which the Doppler shift amount is measured.

In the optical air data sensor in accordance with the present invention, as one embodiment, the Doppler shift amount measurement range is limited by taking a true airspeed measurement value of the immediately preceding cycle as a reference velocity.

Further, in the optical air data sensor in accordance with the present invention, an angle of attack or a sideslip angle of the aircraft can be calculated by performing scanning of the transmission direction of the laser beam and two-dimensionally or three-dimensionally expanding an airspeed vector.

Further, in the optical air data sensor in accordance with the present invention, turbulence measurements are conducted by considering a difference between an immediately preceding average airflow velocity vector and the newest airflow velocity vector as a turbulence component.

In the optical air data sensor in accordance with the present invention, an equivalent airspeed is calculated by multiplying a true airspeed by $\sqrt{(\rho/\rho 0)}$ in measuring the true airspeed, where $\rho$ is an air density at a flight altitude and $\rho 0$ is an air density at a sea level altitude.

A sound velocity a (m/s) is determined from the following equation by using an outside air temperature t (°C.) at a flight altitude, and a Mach number is calculated as a ratio of a true airspeed to the sound velocity a.

$$a = 340.4 \times \sqrt{\{(273+t)/288\}}$$

In the optical air data sensor in accordance with the present invention, the Doppler shift amount measurement range is limited by taking a measurement value determined by another airspeed measurement means instead of the true airspeed measurement value of the immediately preceding cycle as a reference velocity.

The effect demonstrated by the optical air data sensor in accordance with the present invention is that a calibration flight test of a Pitot tube can be efficiently performed by measuring an airflow in a region in which a flow field is not affected by the aircraft itself. Further, when the sensor in accordance with the present invention is used as a replacement for a Pitot tube, the sensor can be used for low-speed aircrafts such as helicopters, airships, and vertical and/or short take-off and landing (V/STOL) apparatuses for which the airspeed cannot be measured with sufficient accuracy by a Pitot tube. Further, using the sensor in combination with a Pitot tube makes it possible to use the sensor for health monitoring the Pitot tube or as a backup when a failure occurs in the Pitot tube. When turbulence is measured, the sensor can be used for a measured test of wake turbulence and also can be expected to reduce shaking of the aircraft in the turbulent region.

When a Doppler shift amount is measured, the frequency measurement range is limited by the restrictions placed by the capabilities of an AD converter, and in a case in which an airflow with a velocity higher than the wind velocity is superimposed, as in the case of an aircraft, the frequency measurement range should be offset by inputting a reference velocity from the outside. Therefore, with the conventional technology, the reference velocity should be inputted from the outside and the Doppler LIDAR has no function of determining autonomously the absolute airspeed. The optical air data sensor in accordance with the present invention can measure a true airspeed without setting a reference velocity.

Further, an angle of attack or a sideslip angle of the aircraft can be calculated by scanning a transmission direction of the laser beam, two-dimensionally or three-dimensionally expanding an airspeed vector, and conducting three-dimensional velocity vector measurements.

DESCRIPTION OF THE PREFERRED EMBODIMENTS

The present invention will be explained below in greater detail on the basis of embodiments thereof illustrated by the appended drawings. The present invention is not limited by the embodiments.

Figure 1:
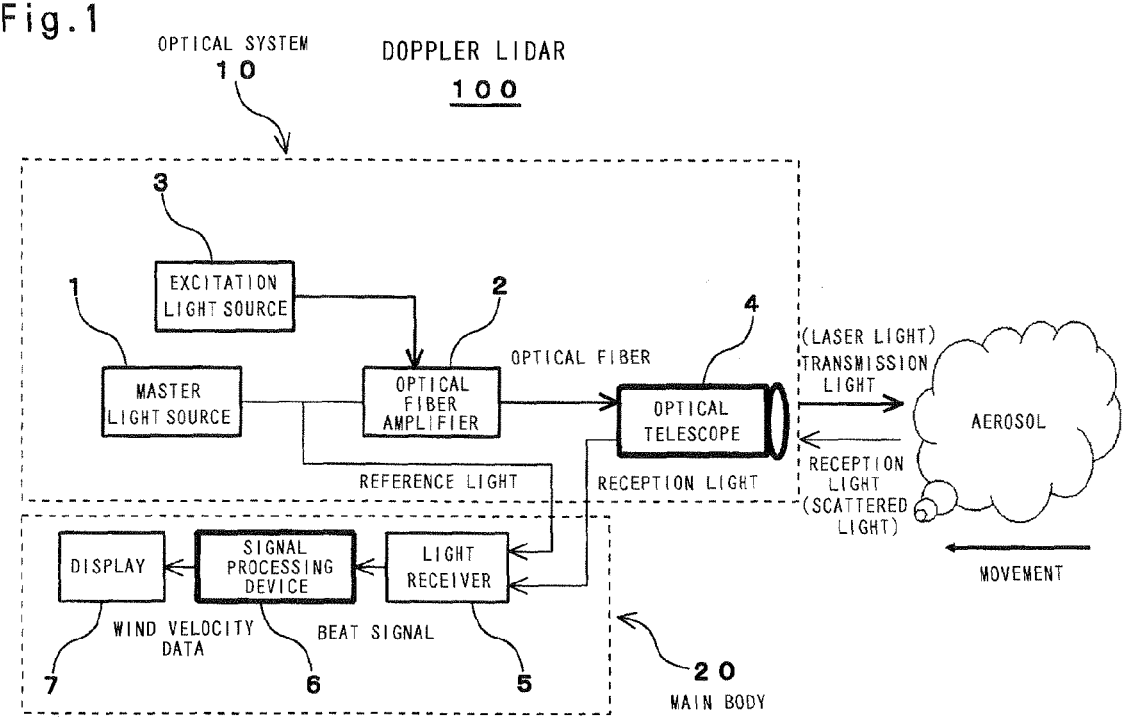
FIG. 1 is an explanatory drawing illustrating the configuration of a Doppler LIDAR as an optical air data sensor in accordance with the present invention.

FIG. 1 is an explanatory drawing illustrating the configuration of a Doppler LIDAR 100 as an optical air data sensor in accordance with the present invention.

This Doppler LIDAR 100 is configured to include an optical system 10 that emits a laser light as a transmission light toward aerosol that is floating in the atmosphere and receives a laser light scattered from the aerosol as a reception light, and a main body 20 that measures the wind velocity on the basis of the wavelength variation amount (Doppler shift amount) between the reception light and transmission light.

The optical system 10 includes a master light source 1 that generates a very weak laser light (reference light) serving as a transmission light, an optical fiber amplifier 2 that amplifies the very weak laser light to obtain the transmission light, an excitation light source 3 that generates a laser light serving as a pump light that excites the optical fiber amplifier 2, and an optical telescope 4 that emits the transmission light to a distant region and collects the scattered light from the distant region. For example, a near-infrared laser light in a wavelength band of 1.5 μm can be used as the transmission light, and a high-efficiency laser diode can be used as the excitation light source. A Doppler LIDAR of a fiber amplifier system, such as the Doppler LIDAR 100, has a large variety of excellent features for the device to be mounted on an aircraft, such as a small size, a light weight, low power consumption, low electromagnetic noise, a high degree of freedom in layout design, high resistance to vibrations, high dust-proofing ability, easiness of processability, and possibility of omitting a liquid cooling mechanism.

The main body 20 is composed of a light receiver 5 that receives the laser scattered light, combines the received light with the reference light, and outputs a beat signal, a signal processing device 6 that processes the beat signal and calculates a wind velocity of airflow in front of the aircraft, and a display 7 that displays the wind velocity measurement results.

A usual frequency measurement method for measuring the wind velocity of airflow in front of the aircraft in the Doppler LIDAR will be explained below. In the usual frequency measurement method, a frequency fT of a laser light generated from a reference light source is emitted as a transmission light into the atmosphere to irradiate the aerosol flowing in the atmosphere.

The laser scattered light that has been scattered by the aerosol is received as the reception light and a wavelength variation amount (Doppler shift amount) between the reception light and the transmission light is measured. For example, let us assume that the frequency of the reception light is shifted under the effect of wind velocity of airflow by a Doppler shift amount fD with respect to the frequency fT of the transmission light. In this case, the frequency fR of the reception light becomes as follows:

$$fR = fT + fD \quad (1)$$

In the light receiver, the reception light is combined with the transmission light (reference light) imparted with a frequency offset, and a beat signal is outputted. For example, when the frequency offset amount of the reference light provided when the frequency is measured is taken as fOFST, the frequency fDIFF of a difference frequency signal in the outputted beat signal obtained by combining the reception light with the transmission light imparted with a frequency offset can be represented as follows:

$$fDIFF = fR - (fT + fOFST) \quad (2)$$
$$= fD - fOFST$$

In addition to the Doppler shift caused by wind velocity of airflow, the Doppler shift amount fD also includes a Doppler shift amount caused by the velocity of the aircraft itself. Thus, where the Doppler shift amount caused by wind velocity of airflow is denoted by fDW and the Doppler shift amount caused by the velocity of the aircraft itself is denoted by fDG, the Doppler shift amount fD can be represented as follows:

$$fD = fDW + fDG \quad (3)$$

Where the Doppler shift amount fD of Eq. (3) is substituted to Eq. (2), the frequency fDIFF of the beat signal in Eq. (2) will be represented as follows:

$$fDIFF = (fDW + fDG) - fOFST \quad (4)$$

The velocity V can be calculated in the following manner from the frequency fDIFF of the beat signal in Eq. (4).

$$V = c/(2fT) \times fDIFF \quad (5)$$
$$= c/(2fT) \times \{(fDW + fDG) - fOFST\}$$

Here c is a velocity of light.

In the usual frequency measurements in which the wind velocity of airflow in front of an aircraft is measured with a Doppler LIDAR, the own velocity VG of the aircraft that has been separately measured is inputted as a reference velocity from the outside, and the Doppler shift amount $2fT/c \times VG$ ($=fDG$) caused by the own velocity of the aircraft is calculated in advance. The effect produced by the own velocity of the aircraft is then removed in advance by taking the Doppler shift amount that has been calculated in advance as a frequency offset amount fOFST ($=2fT/c \times VG$) of the reference light, and a wind velocity Vw of airflow is calculated. Thus, the wind velocity Vw of airflow is calculated in the below-described manner.

$$Vw = c/(2fT) \times \{(fDW + fDG) - 2fT/c \times VG\} \quad (6)$$
$$= c/(2fT) \times fDW$$

Here, $fDG = 2fT/c \times VG$.

Thus, in frequency measurements in which only the wind velocity of airflow in front of the aircraft is measured, only the Doppler shift amount fDW caused by the wind velocity of airflow may be measured as described hereinabove. For example, when calculated as a velocity, a wind velocity of from about −30 m/s to about +30 m/s may be measured. By contrast, when the airspeed of the aircraft is measured, the measured value should also include the Doppler shift caused by the own velocity of the aircraft. For example, the maximum cruise velocity of a standard passenger plane is about 250 m/s and the velocity should be measured over a range that is wider than in the case of wind velocity measurements.

Usually, when a Doppler shift is measured, the beat signal is converted into a digital signal by an AD converter, and the Doppler shift amount is calculated by digital signal processing. Where a sampling frequency during conversion to the digital signal by the AD converter is denoted by fs, the maximum value fDmax of the Doppler shift amount that can be measured based on a sampling theorem can be given as follows:

$$fDmax = fs/2 \quad (7)$$

A maximum value Vmax of velocity that can be measured from the maximum value fDmax of the Doppler shift amount is presented below.

$$Vmax = c/(2fT) \times fDmax \quad (8)$$
$$= c/(4fT) \times fs$$

For example, when the sampling frequency fs is 100 MHz and the wavelength $\lambda (= c/fT)$ of the laser light is 1.55 µm, Vmax is 38.75 m/s. Thus, when only the wind velocity of airflow of from about −30 m/s to about +30 m/s is measured, by giving the Doppler shift amount corresponding to the own velocity of the aircraft in advance as a frequency offset, it is possible to confine a range of wind velocity that is necessary for measurements within a range of maximum wind velocity that can be measured. Therefore, no sweeping of the reference velocity is necessary. By contrast, when the airspeed is measured, the velocity within a wide range of, for example, from a low-speed region of equal to or below 30 m/s to a high-speed region of equal to or higher than 250 m/s should be autonomously determined. Increasing the sampling frequency fs of the AD converter can be also considered as a method adapted for this measurement range, but this method is ineffective due to restrictions placed by capabilities of the AD converter and increased load of digital signal processing.

Figure 2:
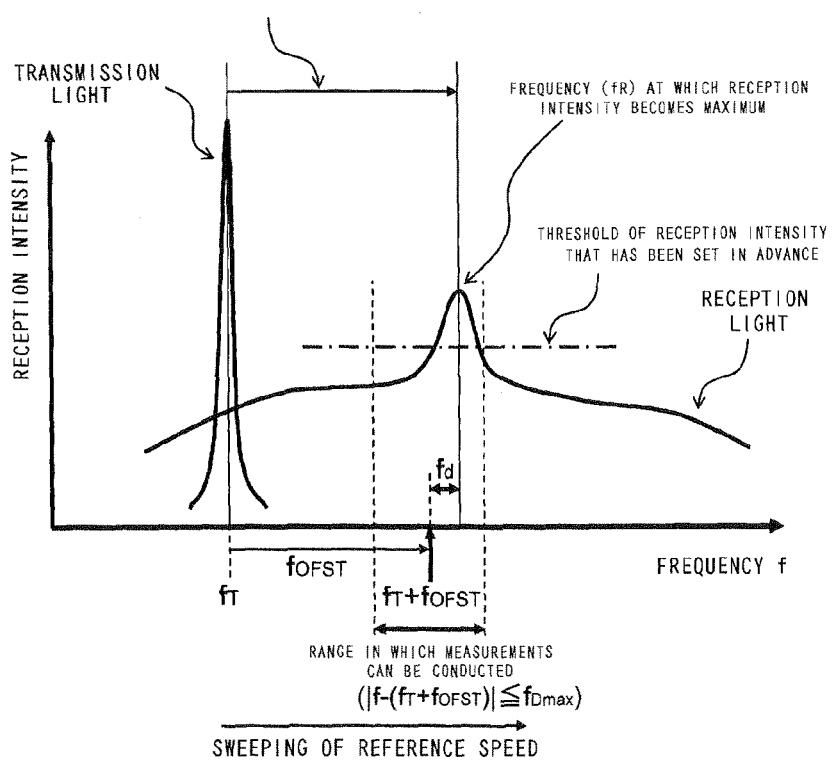
FIG. 2 is an explanatory drawing illustrating a sweeping method of a frequency measurement range in accordance with the present invention.

Thus, in accordance with the present invention, a reference velocity for offsetting the measurement frequency is swept over the measurement range, and when a value larger than a threshold of reception intensity that has been set in advance is detected, the velocity corresponding to the frequency at which such a maximum is assumed is taken as the aircraft airspeed and the airspeed can thus be autonomously measured. FIG. 2 shows how the reference velocity for offsetting the measurement frequency is swept and a Doppler shift amount corresponding to the airspeed is detected. Thus, sweeping of the frequency offset amount corresponding to the reference velocity is successively conducted over the measurement range, and the airspeed Va corresponding to the Doppler shift amount fDA corresponding to the airspeed is calculated in the following manner:

$$Va = c/(2fT) \times fDA \quad (9)$$
$$= c/(2fT) \times (fOFST + (fDA - fOFST))$$
$$= c/(2fT) \times (n\Delta f + (fDA - n\Delta f))$$

Here, the frequency offset amount corresponding to the reference velocity is fOFST=nΔf (n=0, 1, 2, . . . ), and the range in which the Doppler shift amount related to fOFST can be measured is |f−(fT+fOFST)|≦fDmax.

The sweeping of the reference velocity is performed by continuously changing the value of n in fOFST=nΔf, and a value of n at a point in time at which a value larger than a threshold of reception intensity that has been set in advance is detected, that is, at a point in time at which |fDA−nΔf|≦fDmax, is taken as Nmax. When the Doppler shift amount at which the reception intensity becomes maximum with respect to the frequency offset amount fOFST=NmaxΔf is denoted by fd, the Doppler shift amount fDA corresponding to the airspeed becomes as follows:

$$fDA = Nmax\Delta f + fd \quad (10)$$

The airspeed Va is determined in the following manner from Eq. (10).

$$Va = c/(2fT) \times fDA \quad (11)$$
$$= c/(2fT) \times (Nmax\Delta f + fd)$$

As described hereinabove, in a Doppler LIDAR in which a wind velocity of airflow in a distant region is measured on the basis of a Doppler shift amount between a transmission light and a reception light, the airspeed of the aircraft can be autonomously measured by providing the Doppler LIDAR with a function of performing sweeping with the reference velocity for offsetting the measurement frequency, detecting a value that is larger than a threshold of reception intensity that has been set in advance, and calculating the velocity from a frequency at which the reception intensity becomes maximum in the range of detected values. Further, since the airspeed is measured on the basis of a Doppler shift amount between the transmission light and the reception light, measurements can be also conducted in a low-speed region in which the measurements with a Pitot tube are impossible. Further, with the present device the velocity of airflow is measured in a region in which the aircraft itself produces no effect on the flow field and therefore no measurement error caused by position error is generated. Accordingly, by using the present device, it is possible to perform efficiently the calibration flight test of Pitot tubes. Furthermore, since the distance in which the aircraft itself produces no effect on the flow field is about several tens of meters, when the present device is used as an air data sensor, the device with a comparatively small output that is less than that of the conventional Doppler LIDAR that measures a wind velocity of airflow in a distant region can be put to practical use.

By contrast with the wind velocity of airflow, it is physically impossible for the aircraft airspeed to change instantaneously. Therefore, by using the Doppler shift amount corresponding to the airspeed measured in the immediately preceding cycle as a frequency offset amount, it is possible to limit the measurement range of the reception frequency, reduce the load of signal processing, and shorten the measurement time. More specifically, when the Doppler shift amount measured in the immediately preceding cycle is fDAO, this Doppler shift amount fDAO is used as the frequency offset amount fOFST in the present measurements. The range in which the measurements can be conducted becomes |f−(fT+fDAO)|≦fDmax, but since the aircraft airspeed usually cannot change instantaneously, it is highly probable that the variation amount of aircraft airspeed will be within the aforementioned range in which the measurements can be conducted. Thus, by using the measurement value of the immediately preceding cycle, it is possible to measure the airspeed, without sweeping the frequency offset. Depending on various conditions such as atmospheric conditions, the measurement value can also include noise. Therefore, the measurement accuracy can be expected to be further improved by using an average value of a plurality of values, rather than one measurement value, as the measurement value of the immediately preceding cycle.

Figure 3:
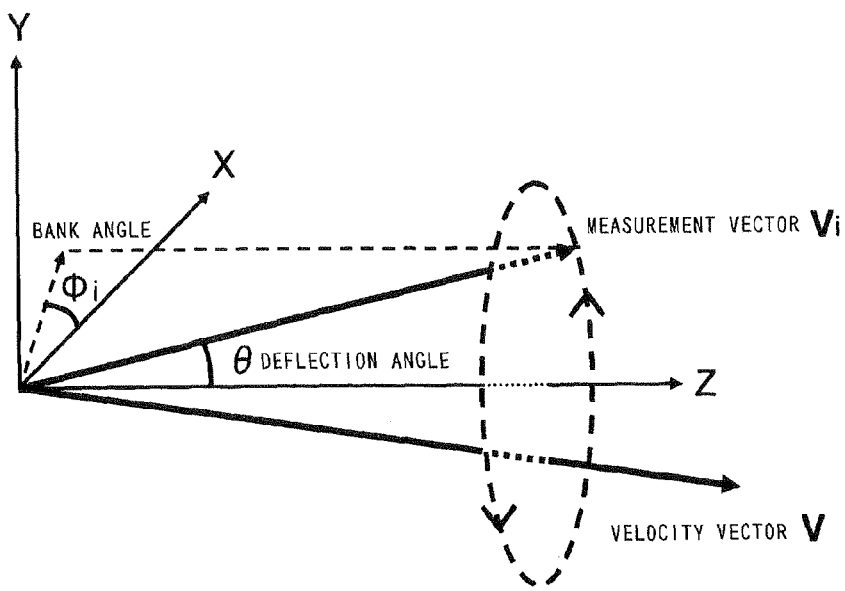
FIG. 3 is an explanatory drawing illustrating a method for three-dimensionally breaking down airspeed components in accordance with the present invention.

The Doppler LIDAR measures only an airspeed component in the laser beam emission direction, but by performing conical scanning of the laser beam forward from the aircraft in the fuselage axis direction, it is possible to break down the airspeed component into velocity components in the direction along the fuselage axis, transverse direction, and vertical direction and to calculate the angle of attack and sideslip angle of the aircraft. FIG. 3 shows a method for three-dimensionally breaking down the airspeed components by performing conical scanning of the laser beam forward from the aircraft in the fuselage axis direction. Where an angle (deflection angle of the laser beam) formed by an irradiation laser beam from a laser beam source with a fuselage axis passing through a position of the laser beam source in scanning the laser beam with the Doppler LIDAR is denoted by θ, a beam direction number when the conical scanning of the laser beam is performed is denoted by i, the observed beam value is denoted by M, and a bank angle of the beam direction (angle formed with the transverse axis of the fuselage) is denoted by ϕi, the velocity components in the direction along the fuselage axis, transverse direction, and vertical direction are measured by changing the bank angle ϕi of the laser beam and performing conical scanning of the measurement vector. When the airflow in the measurement region is assumed to be uniform in such laser beam scanning, the velocity vector V=(Vx, Vy, Vz) can be determined in the following manner.

$$\begin{bmatrix} Vx \\ Vy \\ Vz \end{bmatrix} = \begin{bmatrix} \sum_{i=1}^{M}\cos^2\phi_i\cos^2(\frac{\pi}{2}-\theta) & \sum_{i=1}^{M}\sin\phi_i\cos\phi_i\cos^2(\frac{\pi}{2}-\theta) & \sum_{i=1}^{M}\cos\phi_i\sin(\frac{\pi}{2}-\theta)\cos(\frac{\pi}{2}-\theta) \\ \sum_{i=1}^{M}\cos\phi_i\sin\phi_i\cos^2(\frac{\pi}{2}-\theta) & \sum_{i=1}^{M}\sin^2\phi_i\cos^2(\frac{\pi}{2}-\theta) & \sum_{i=1}^{M}\sin\phi_i\cos(\frac{\pi}{2}-\theta)\sin(\frac{\pi}{2}-\theta) \\ \sum_{i=1}^{M}\cos\phi_i\cos(\frac{\pi}{2}-\theta)\sin(\frac{\pi}{2}-\theta) & \sum_{i=1}^{M}\sin\phi_i\cos(\frac{\pi}{2}-\theta)\sin(\frac{\pi}{2}-\theta) & \sum_{i=1}^{M}\sin^2(\frac{\pi}{2}-\theta) \end{bmatrix}^{-1} \begin{bmatrix} \sum_{i=1}^{M} V_i\cos\phi_i\cos(\frac{\pi}{2}-\theta) \\ \sum_{i=1}^{M} V_i\sin\phi_i\cos(\frac{\pi}{2}-\theta) \\ \sum_{i=1}^{M} V_i\sin(\frac{\pi}{2}-\theta) \end{bmatrix} \quad (12)$$

Here, Vi stands for a measurement velocity in the i-th measurement vector. Further, Vx is a transverse component of airspeed (in the X-axis direction in FIG. 3), Vy is a vertical component of airspeed (in the Y-axis direction in FIG. 3), and Vz is a longitudinal component of airspeed (in the Z-axis direction in FIG. 3).

By so scanning the transmission direction of the laser beam and three-dimensionally breaking down the airspeed, it is possible to calculate the airspeed in the vertical and transverse directions and therefore determined the angle of attack and sideslip angle of the aircraft.

Further, a velocity vector can be also calculated from a two-dimensional vector of a measurement vector in the measurement point of a bank angle $\phi i$ and a measurement vector in the measurement point of a bank angle $\phi i-180°$. In this case, the X-axis direction component Vx and Y-axis direction component Vy of the velocity vector V can be determined in the following manner:

$$\begin{bmatrix} Vx \\ Vy \end{bmatrix} = \begin{bmatrix} \sum_{i=1}^{M/2} 2\cos^2\phi_i \cos^2\left(\frac{\pi}{2}-\theta\right) & \sum_{i=1}^{M} 2\sin\phi_i\cos\phi_i\cos^2\left(\frac{\pi}{2}-\theta\right) \\ \sum_{i=1}^{M/2} 2\cos\phi_i\sin\phi_i\cos^2\left(\frac{\pi}{2}-\theta\right) & \sum_{i=1}^{M/2} 2\sin^2\phi_i\cos^2\left(\frac{\pi}{2}-\theta\right) \end{bmatrix}^{-1} \quad (13)$$

$$\begin{bmatrix} \sum_{i=1}^{M/2} (V_i - V_i')\cos\phi_i\cos\left(\frac{\pi}{2}-\theta\right) \\ \sum_{i=1}^{M/2} (V_i - V_i')\sin\phi_i\cos^2\left(\frac{\pi}{2}-\theta\right) \end{bmatrix}$$

Here, Vi is a measurement velocity in the measurement vector of a bank angle $\phi i$, and Vi' is a measurement velocity in the measurement vector of a bank angle $\phi i-180°$.

The Z-axis direction component Vz of the velocity vector V can be determined in the following manner.

$$Vz = \frac{\sum_{i=1}^{M} V_i \sin\left(\frac{\pi}{2}-\theta\right)}{M} \quad (14)$$

With this equation, the velocity vector is calculated using measurement vectors in two most distant points, that is, two point separated by 180°. Therefore, the effect of an error of the bank angle $\phi i$ of beam direction is less than that demonstrated when a method using Eq. (12) is used. As a result, a calculation error of velocity vector can be reduced even when the measurement vector is measured in a state in which the scanned beam is rotated at a constant rate without stopping the scanned laser beam. In this case, the starting torque can be small and therefore the consumed power can be reduced.

Further, in the above-described device, turbulence components in a region in which the aircraft itself produces no effect on the flow field can be measured by measuring the difference between the immediately preceding average airflow velocity vector and the newest airflow velocity vector. More specifically, where the stationary component vector of airflow velocity in a certain point in time i is denoted by Vs(i) and a turbulence component vector is denoted by Vt(i), the airflow velocity vector V(i) can be represented in the following manner.

$$V(i)=Vs(i)+Vt(i) \quad (15)$$

In the airflow velocity vector V(i), the present point in time is taken as i=N and the average airflow velocity vector E[V] is calculated in the following manner from M data relating to points in time i=N−1, N−2, . . . , N−M preceding the present point in time.

$$\begin{aligned} E[V] &= \sum V(i)/M \\ &= \sum (Vs(i) + Vt(i))/M \\ &\approx \sum Vs(i)/M \end{aligned} \quad (16)$$

The turbulence component vector can be assumed to change randomly and $\Sigma Vt(i)/M \approx 0$.

Accordingly, a turbulence component at the present point in time can be measured in the following manner by calculating the difference between the airflow velocity vector V(N) at the present point in time and the immediately preceding vector E[V]:

$$\begin{aligned} V(N) - E[V] &\approx (Vs(N) + Vt(N)) - \sum Vs(i)/M \\ &\approx Vt(N) \end{aligned} \quad (17)$$

The probability of the aircraft airspeed producing a significant effect and the stationary component of the airflow velocity changing instantaneously is low. Therefore, $Vs(N) \approx \Sigma Vs(i)/M$.

As described above, the Doppler LIDAR can measure the airflow in a distant region. In other words, the aircraft can know in advance an airflow state such as turbulence that will be reached by the aircraft. Modern passenger planes have a function of conducting adequate steering automatically with autopilot to reduce shaking induced by turbulence, but information serving as a base therefor is an airspeed and an acceleration. In accordance with the present invention, airflow information at a several tens of meters in front of the aircraft is continuously measured and the variation amount thereof is recognized as a turbulence component, wherein input information for autopilot is obtained.

Further, the measurement value obtained with the Doppler LIDAR corresponds to the velocity at which the aircraft moves with respect to a typical flow, that is, a true airspeed. An equivalent airspeed flow that produces an aerodynamic effect on the aircraft can be approximated by multiplying the true airspeed by $\sqrt{(\rho/\rho 0)}$. Here, $\rho$ is an air density at the flight altitude and $\rho 0$ is an air density at a sea level altitude. $\rho$ can be determined by an air pressure altimeter that is always installed on a typical aircraft. As for a Mach number, a sound velocity a is determined by the following formula by using external temperature information, and a ratio of the true airspeed to the sound velocity a is taken as a Mach number:

$$a=340.4 \times \sqrt{\{(273+t)/288\}} \quad (18)$$

where, a is a sound velocity (m/s) and t is an outside air temperature (° C.).

EXAMPLE 1

Figure 4:
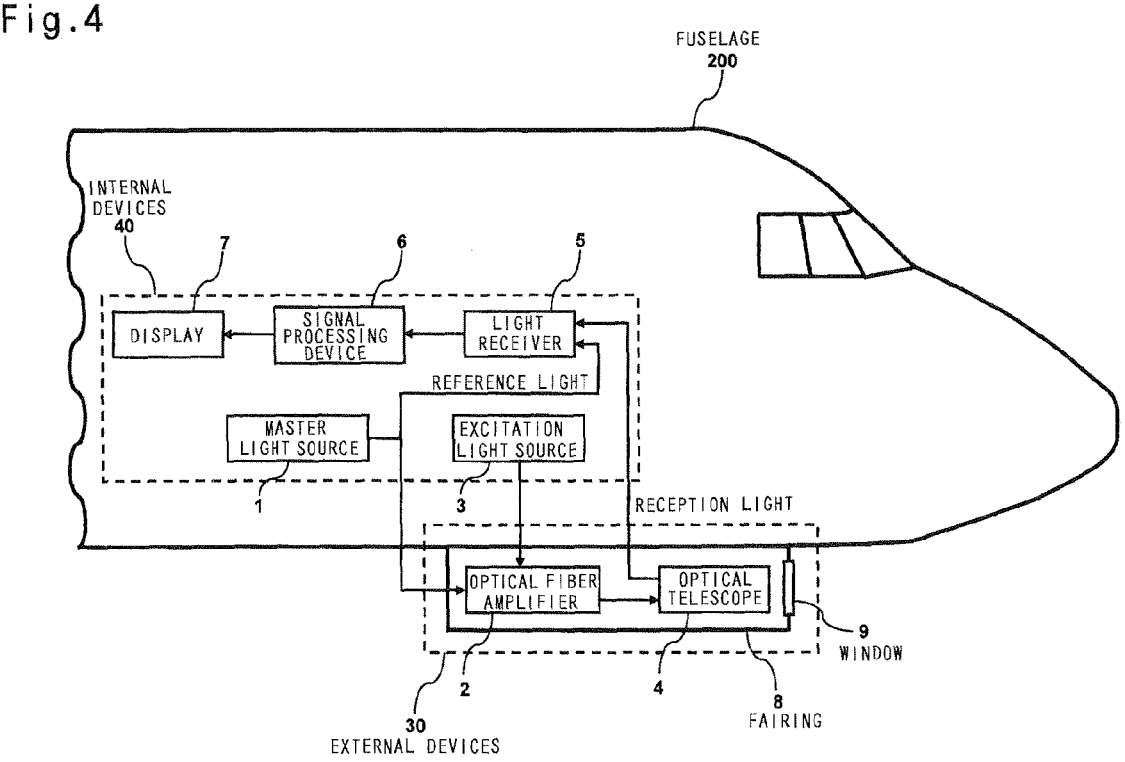
FIG. 4 is an explanatory drawing illustrating the configuration of a true airspeed measurement device according to Embodiment 1 of the present invention.

FIG. 4 is an explanatory drawing illustrating the configuration of a true airborne airspeed measurement device in accordance with the present invention. As shown in the figure, an optical telescope and an optical fiber amplifier are mounted on a lower surface of a fuselage, and the externally installed devices are covered with a fairing 8 to reduce air resistance. A window 9 is disposed in the direction in which a laser light is transmitted, thereby enabling the transmission of a laser light and the reception of a scattered light. In the present example, a configuration is used in which an optical telescope and an optical fiber amplifier are mounted on a lower surface of a fuselage, but this configuration is not limiting, and mounting these devices on the side surface of the fuselage nose and lower surface of a main wing can be also considered. Thus, the devices may be mounted in a location where the individual fuselage configuration enables easy installation. The devices other than the above-described devices are installed inside the aircraft.

In accordance with the present invention, an optical remote airflow measurement device is used that measures a wind velocity of airflow in a distant region on the basis of a Doppler shift amount between a transmission light and a reception light, and this device is provided with a function of performing sweeping by a reference velocity to offset the measurement frequency and, when a value larger than a threshold of reception intensity that has been set in advance is detected, calculating a velocity corresponding to the frequency at which such a maximum is assumed, thereby calculating the aircraft airspeed autonomously. A suitable laser may emit infrared radiation that is safe to retina and hardly affected by weather conditions. In the present example, a laser emitting radiation in a 1.5 μm is used.

Since the airspeed is measured on the basis of a Doppler shift amount between the transmission light and reception light, a true airspeed can be measured in a low-speed region in which the airspeed cannot be measured with sufficient accuracy by a Pitot tube, and applications to low-speed aircrafts such as helicopters, airships, and vertical and/or short take-off and landing (V/STOL) apparatuses are possible. Further, in the present device the velocity of airflow is measured in a region in which the flow field is not affected by the aircraft itself. Therefore, a measurement error caused by a position error is not generated and a calibration flight test of a Pitot tube can be efficiently performed. In addition, since the distance at which the flow field is not affected by the aircraft itself is several tens of meters, when the device is used as an air data sensor, it is possible to use a device with an output lower than that of the conventional optical distance airflow measurement device that measures a wind velocity of airflow in a distant region.

EXAMPLE 2

Once the airspeed is determined, as in Example 1, the measurement value of the immediately preceding cycle is used as a frequency offset value. However, depending on various conditions such as atmospheric conditions, the measurement value can also include noise. Therefore, the measurement value of the immediately preceding cycle is an average value of a plurality of values, rather than one measurement value. In airspeed measurements performed with a typical Pitot tube, abrupt changes can decrease visibility for the pilot. Therefore, an orifice is introduced in a conduit system to improve the display contrast. For this reason, with respect to the airspeed measured by a Doppler LIDAR, the configuration is also appropriate for displaying a moving average value of about 3 s.

When measurements temporarily become impossible and the reception intensity within the frequency measurement range does not reach the threshold that has been set in advance, for example, because of a large noise level, frequency sweeping of Example 1 is performed and the frequency offset is reset.

EXAMPLE 3

Figure 5:
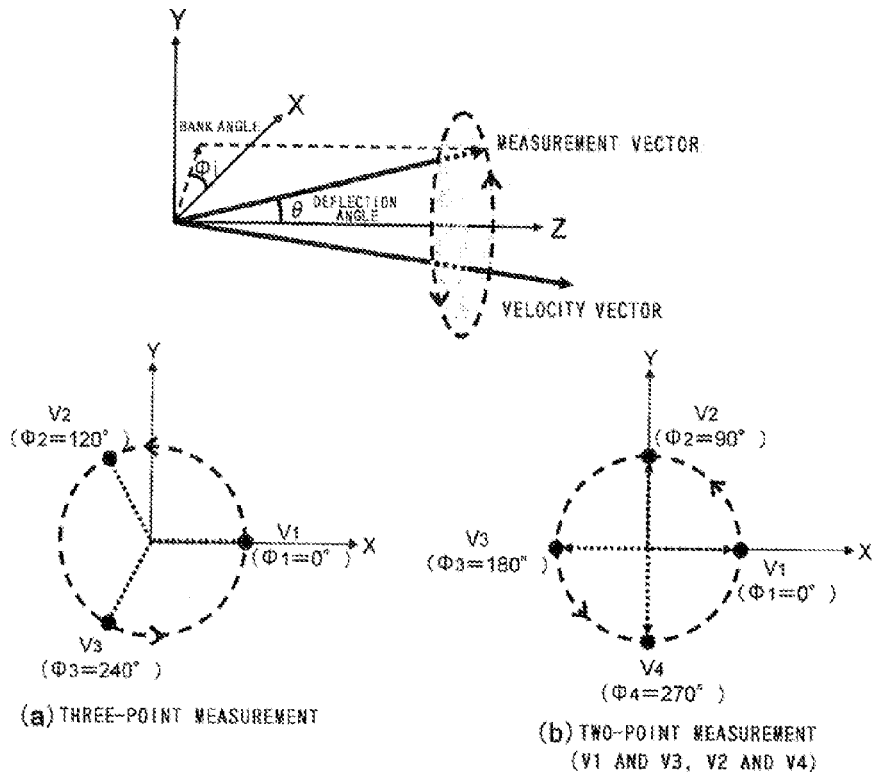
FIG. 5 is an explanatory drawing illustrating a method for measuring airspeed components according to Embodiment 3 of the present invention.

FIG. 5 is an explanatory drawing illustrating a method for measuring velocity components, namely, a transverse component Vx of airspeed (in the X axis direction in FIG. 5), a vertical component Vy of airspeed (in the Y axis direction in FIG. 5), and a longitudinal component Vz of airspeed (in the Z axis direction in FIG. 5), by fixing the deflection angle θ and rotating the bank angle φi, as a laser beam scanning method. For example, the scanned laser beam is stopped in three points that are not in the same plane, velocity components V1, V2, V3 of the measurement vector are measured, and velocity components in the X axis direction, Y axis direction, and Z axis direction are calculated from the measured velocity components in the three points (three-point measurement). In this case, the velocity vector V=(Vx, Vy, Vz) can be determined in the following manner.

$$\begin{bmatrix} Vx \\ Vy \\ Vz \end{bmatrix} = \begin{bmatrix} \cos\phi_1\cos\left(\frac{\pi}{2}-\theta\right) & \sin\phi_1\cos\left(\frac{\pi}{2}-\theta\right) & \sin\left(\frac{\pi}{2}-\theta\right) \\ \cos\phi_2\cos\left(\frac{\pi}{2}-\theta\right) & \sin\phi_2\cos\left(\frac{\pi}{2}-\theta\right) & \sin\left(\frac{\pi}{2}-\theta\right) \\ \cos\phi_3\cos\left(\frac{\pi}{2}-\theta\right) & \sin\phi_3\cos\left(\frac{\pi}{2}-\theta\right) & \sin\left(\frac{\pi}{2}-\theta\right) \end{bmatrix}^{-1} \begin{bmatrix} V_1 \\ V_2 \\ V_3 \end{bmatrix} \quad (19)$$

Here, V1, V2, and V3 are measurement velocities at φ1=0°, φ2=120°, and φ3=240°, respectively.

Further, the velocity vector can be also calculated from a two-dimensional vector represented by a measurement vector in a measurement point of a bank angle φi and a measurement vector in a measurement point of a bank angle φi−180°. For example, V1, V2, V3, and V4 that are velocity components of a measurement vector at φ1=0°, φ2=90°, φ3=180°, and φ4=270°, respectively, are measured and velocity components in the X axis direction and y axis direction are calculated (two-point measurement) respectively from V1 and V3 and from V2 and V4, which are the velocity components of the measurement vector mutually separated by 180°. Thus, the velocity Vx in the X axis direction and the velocity Vy in the Y axis direction can be determined in the following manner.

$$\begin{cases} Vx = \dfrac{1}{2\cos\left(\frac{\pi}{2}-\theta\right)}(V_1 - V_3) \\ Vy = \dfrac{1}{2\cos\left(\frac{\pi}{2}-\theta\right)}(V_2 - V_4) \end{cases} \quad (20)$$

Since the airspeed in the vertical direction and transverse direction can thus be calculated by scanning the laser beam and expanding the airspeed components two-dimensionally or tree-dimensionally, the angle of attack or sideslip angle of the aircraft can be determined.

Figure 6:
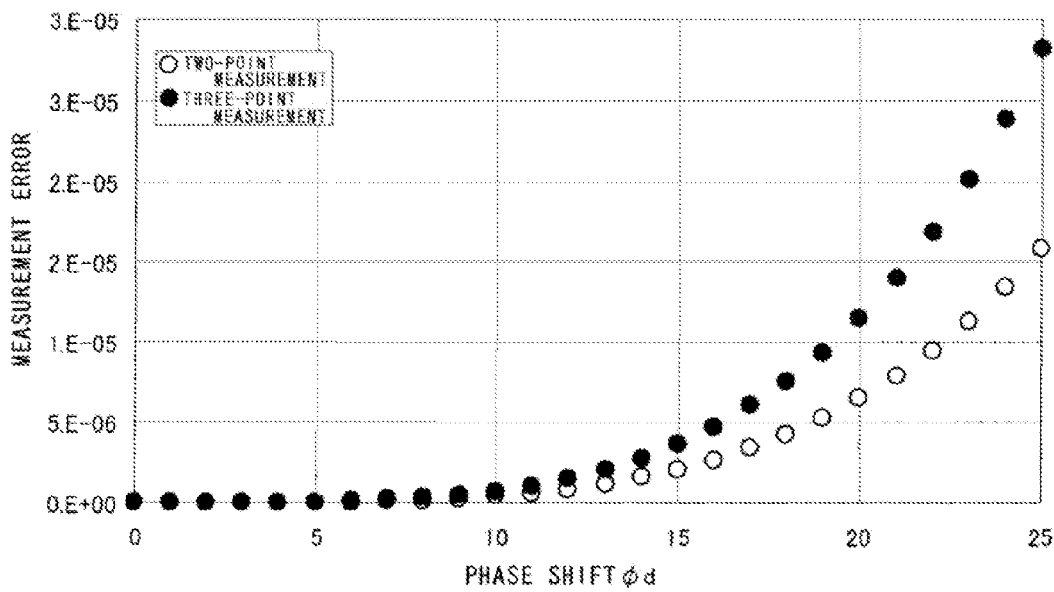
FIG. 6 is an explanatory drawing illustrating a measurement error caused by a phase shift in the measurement method according to Embodiment 3 of the present invention.

In the two-point measurement method, the velocity vector is measured by using measurement vectors in two points with the largest distance of 180° (bank angle) from each other. Therefore, the effect of error of the bank angle φi of the beam can be reduced by comparison with that of the method based on three-point measurements. For example, in FIG. 6 the measurement error occurring when a measurement point of a certain one point shifts by a φd phase from a predetermined measurement point is compared for the two-point measurement method and three-point measurement method. The result indicates that the effect of phase shift is less in two-point measurements than in three-point measurements. Therefore, when measurements are conducted with the measurement vector in a state in which the scanned beam is rotated at a constant velocity, without stopping, the velocity vector calculation error in two-dimensional measurements can be made less than in three-dimensional measurements. In this case, the starting torque can be small and therefore the consumed power can be reduced.

EXAMPLE 4

Figure 7:
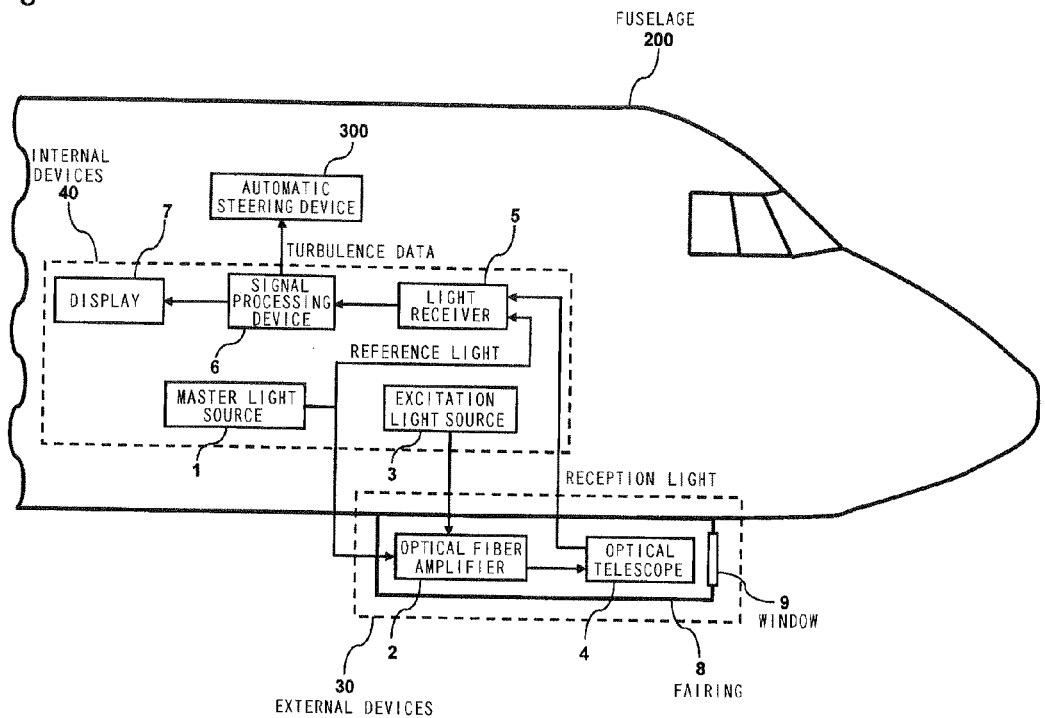
FIG. 7 is an explanatory drawing illustrating the configuration of a turbulence measurement device according to Embodiment 4 of the present invention.

FIG. 7 is an explanatory drawing illustrating a turbulence measurement device according to Example 4 of the present invention. With the Doppler LIDAR as a turbulence measurement device, a turbulence component in a region in which flow field is not affected by the aircraft itself is measured by measuring a difference between an immediately preceding average airflow velocity vector and a newest airflow velocity vector. The measured turbulence component is inputted as input information in an automatic steering device 300 and adequate steering is automatically performed to reduce shaking caused by the turbulence. The maximum cruise velocity of a standard passenger plane is about 250 m/s, and where an airflow is present 50 m in front, it is reached in 0.2 s. No measures can be taken by a pilot within such a short interval, but steering with an autopilot is possible. Changing an angle of attack by using an elevator has been used to change the lift, but the inertia momentum of the fuselage creates a delay, and pitching makes the flight very uncomfortable for the passengers in the rear seats. Direct lift control with a flap or spoiler is necessary, and the steering system itself should be made adaptable to turbulence reducing control by using a flap mechanism capable of high-speed steering or adding a droop function for using an auxiliary wing as a flap. Such a steering system has already been put to practice, but it has been rarely used in typical passenger planes.

EXAMPLE 5

Figure 8:
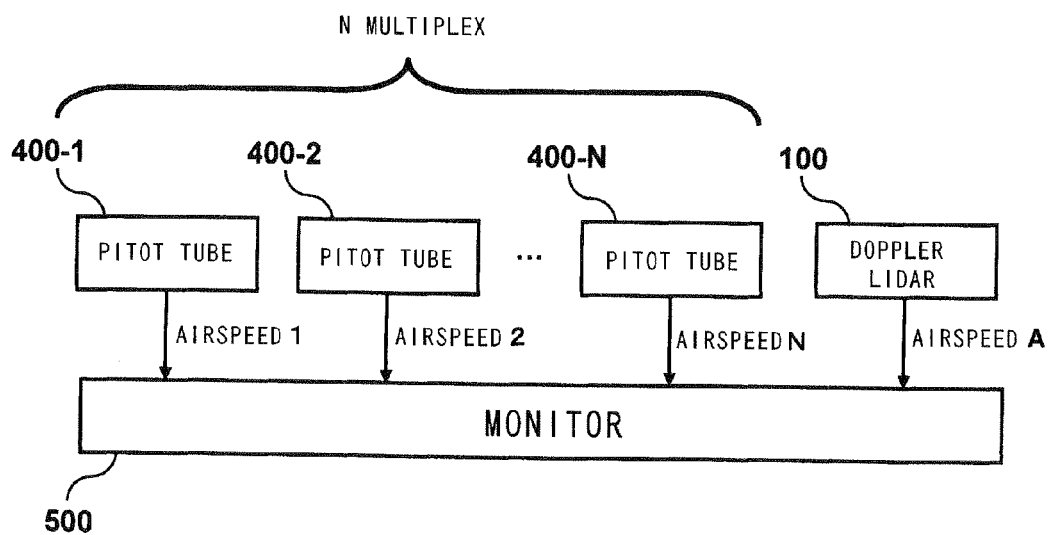
FIG. 8 is an explanatory drawing illustrating the configuration of an airspeed measurement system according to Embodiment 5 of the present invention.

FIG. 8 is an explanatory drawing illustrating an airspeed measurement system according to Example 5 of the present invention. A Doppler LIDAR 100 serving as the airspeed measurement device calculates an equivalent airspeed by inputting static pressure in a true airspeed measurement device. An airspeed is measured by Pitot tubes 400-1 to 400-N in a configuration using multiple (N) numbers of tubes. A monitoring device 500 monitors the airspeed measured by the configuration with multiple Pitot tubes and the Doppler LIDAR. An airspeed measurement system based on a Pitot tube configuration usually has multiple tubes, and a function of generating a warning automatically when the difference in output between the tubes exceeds an allowed value or the output is shielded has already been put to practical use. Therefore, when the warning is generated, the pilot monitors the equivalent airspeed in accordance with the present invention. However, usually where the velocities are compared and the difference therebetween is confirmed to be small, the effect of increasing a sense of securing in case of emergency can be expected. Further, when the Doppler LIDAR 100 serving as an airspeed measurement device temporarily cannot conduct measurements due to excessive noise or the like and the reception intensity within the frequency measurement range does not reach a threshold that has been set in advance, the measurements can be also conducted by converting the airspeed obtained with the Pitot tube or the like in the monitoring device 500 to the true airspeed measurement device by the static pressure information and setting this airspeed as the frequency offset of the Doppler LIDAR.

The sensor in accordance with the present invention can be used as an air data sensor for low-speed aircrafts, an airspeed sensor for flight tests, a backup of the conventional air data sensor, and an air data sensor for flight safety.

What is claimed is:

1. A method for measuring airspeed by an optical air data sensor mounted on an aircraft, said method comprising emitting a laser light as a transmission light into atmosphere, and then receiving a laser scattered light produced by scattering of the laser light by aerosol present in the atmosphere as a reception light, and measuring an airspeed and a wind velocity of airflow in a distant region on the basis of a Doppler shift amount between the transmission light and the reception light,
    wherein, in the range ranging from 30 m/s to 250 m/s, a true airspeed is autonomously measured, without setting a reference velocity, by successively sweeping a frequency offset corresponding to a reference velocity for providing an offset to a measurement frequency, and performing this sweeping within a frequency range in which the Doppler shift amount is measured.

2. The method for measuring airspeed according to claim 1, wherein the Doppler shift amount measurement range is limited by taking a true airspeed measurement value of the immediately preceding cycle as a reference velocity.

3. The method for measuring airspeed according to claim 1, wherein an angle of attack or a sideslip angle of the aircraft is calculated by performing scanning of the transmission direction of the laser beam and two-dimensionally or three-dimensionally expanding an airspeed vector.

4. The method for measuring airspeed according to claim 2, wherein an angle of attack or a sideslip angle of the aircraft is calculated by performing scanning of the transmission direction of the laser beam and two-dimensionally or three-dimensionally expanding an airspeed vector.

5. The method for measuring airspeed according to claim 3, wherein turbulence measurements are conducted by considering a difference between an immediately preceding average airflow velocity vector and the newest airflow velocity vector as a turbulence component.

6. The method for measuring airspeed according to claim 4, wherein turbulence measurements are conducted by considering a difference between an immediately preceding average airflow velocity vector and the newest airflow velocity vector as a turbulence component.

7. The method for measuring airspeed according to claim 1, wherein an equivalent airspeed is calculated by multiplying a true airspeed by $\sqrt{(\rho/\rho 0)}$ in measuring the true airspeed, where $\rho$ is an air density at a flight altitude and $\rho 0$ is an air density at a sea level altitude.

8. The method for measuring airspeed according to claim 2, wherein an equivalent airspeed is calculated by multiplying a true airspeed by $\sqrt{(\rho/\rho 0)}$ in measuring the true airspeed, where $\rho$ is an air density at a flight altitude and $\rho 0$ is an air density at a sea level altitude.

9. The method for measuring airspeed according to claim 1, wherein a sound velocity a (m/s) is determined from the following equation by using an outside air temperature t (° C.) at a flight altitude, and a Mach number is calculated as a ratio of a true airspeed to the sound velocity a $$a = 340.4 \times \sqrt{\{(273+t)/288\}}.$$

10. The method for measuring airspeed according to claim 2, wherein a sound velocity a (m/s) is determined from the following equation by using an outside air temperature t (° C.) at a flight altitude, and a Mach number is calculated as a ratio of a true airspeed to the sound velocity a $$a=340.4\times\sqrt{\{(273+t)/288\}}.$$

11. The method for measuring airspeed according to claim 2, wherein the Doppler shift amount measurement range is limited by taking a measurement value determined by another airspeed measurement means instead of the true airspeed measurement value of the immediately preceding cycle as a reference velocity.

12. The method for measuring airspeed according to claim 3, wherein the Doppler shift amount measurement range is limited by taking a measurement value determined by another airspeed measurement means instead of the true airspeed measurement value of the immediately preceding cycle as a reference velocity.

13. The method for measuring airspeed according to claim 5, wherein the Doppler shift amount measurement range is limited by taking a measurement value determined by another airspeed measurement means instead of the true airspeed measurement value of the immediately preceding cycle as a reference velocity.

14. The method for measuring airspeed according to claim 7, wherein the Doppler shift amount measurement range is limited by taking a measurement value determined by another airspeed measurement means instead of the true airspeed measurement value of the immediately preceding cycle as a reference velocity.

15. The method for measuring airspeed according to claim 9, wherein the Doppler shift amount measurement range is limited by taking a measurement value determined by another airspeed measurement means instead of the true airspeed measurement value of the immediately preceding cycle as a reference velocity.

* * * * *